(12) United States Patent
Ikarashi

(10) Patent No.: US 7,752,994 B2
(45) Date of Patent: Jul. 13, 2010

(54) INDICATING INSTRUMENT

(75) Inventor: Hideki Ikarashi, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 178 days.

(21) Appl. No.: 11/887,458

(22) PCT Filed: Mar. 8, 2006

(86) PCT No.: PCT/JP2006/304428

§ 371 (c)(1),
(2), (4) Date: Sep. 28, 2007

(87) PCT Pub. No.: WO2006/112191

PCT Pub. Date: Oct. 26, 2006

(65) Prior Publication Data

US 2009/0078191 A1    Mar. 26, 2009

(30) Foreign Application Priority Data

Mar. 31, 2005    (JP) ............................. 2005-100283

(51) Int. Cl.
*G01D 13/22* (2006.01)
*G01D 13/02* (2006.01)
*G12B 11/04* (2006.01)

(52) U.S. Cl. .................. 116/303; 116/284; 116/305; 116/332; 116/DIG. 6; 362/29; 340/461

(58) Field of Classification Search .............. 116/284, 116/286–289, 298, 300, 303, 305, 327, 328, 116/332, 62.1, 62.4, 250, 251, 256, 257, 116/DIG. 5, DIG. 6, DIG. 36; 362/23, 26–30, 362/489, 615; 340/461, 815.49
See application file for complete search history.

(56) References Cited

U.S. PATENT DOCUMENTS

| 2,613,629 | A | * | 10/1952 | Maybarduk | ................. 116/300 |
| 3,807,350 | A | * | 4/1974 | Powell | ..................... 116/300 |
| 4,704,984 | A | * | 11/1987 | Mayer | ....................... 116/287 |

(Continued)

FOREIGN PATENT DOCUMENTS

JP      59-112112     7/1984

(Continued)

OTHER PUBLICATIONS

Japanese Office Action issued in Japanese Patent Application No. 2005-100283, mailed Jun. 4, 2009.

*Primary Examiner*—Amy Cohen Johnson
(74) *Attorney, Agent, or Firm*—McDermott Will & Emery LLP

(57) ABSTRACT

To provide an indicating instrument capable of reducing the number of parts and improving the positioning precision. An indicating instrument 1 comprises: an indicator 3; said dial 4 disposed around said indicator 31 an indicating needle 6 for moving around said indicator 3; and a drive source 7 for driving said indicating needle 6. Said indicating needle 6 moves over said dial 4 while bypassing at least the back of said indicator 3, and said indicator 3 and said dial 4 are held by a holding member 2 constituted of a first holding portion 27 for holding said indicator 3 and a second holding portion 28 for holding said dial.

4 Claims, 2 Drawing Sheets

U.S. PATENT DOCUMENTS

| | | | |
|---|---|---|---|
| 5,430,612 A * | 7/1995 | Simon et al. | 361/752 |
| 6,433,701 B1 * | 8/2002 | Simon et al. | 340/815.4 |
| 6,817,310 B2 * | 11/2004 | Sugiyama et al. | 116/62.4 |
| 6,962,127 B2 * | 11/2005 | Birke et al. | 116/305 |
| 7,159,534 B2 * | 1/2007 | Tanaka et al. | 116/300 |
| 7,347,575 B2 * | 3/2008 | Fong et al. | 362/23 |
| 7,357,095 B1 * | 4/2008 | Fong et al. | 116/286 |
| 7,482,915 B2 * | 1/2009 | Sumiya et al. | 340/461 |
| 7,530,702 B2 * | 5/2009 | Luettgen et al. | 362/23 |
| 2008/0174416 A1 * | 7/2008 | Pala et al. | 340/461 |
| 2009/0056616 A1 * | 3/2009 | Yoshida | 116/287 |

FOREIGN PATENT DOCUMENTS

| | | |
|---|---|---|
| JP | 05-021035 U | 5/1993 |
| JP | 2001-516044 A | 9/2001 |
| JP | 2003-254794 A | 9/2003 |
| JP | 2004-45214 A | 2/2004 |
| JP | 2005-024520 | 1/2005 |
| JP | 2005-77208 A | 3/2005 |
| JP | 2005-98965 A | 4/2005 |
| JP | 2005-227264 | 8/2005 |

* cited by examiner

US 7,752,994 B2

INDICATING INSTRUMENT

RELATED APPLICATIONS

This application is the U.S. National Phase under 35 U.S.C. §371 of International Application No. PCT/JP2006/304428, filed on Mar. 8, 2006, which in turn claims the benefit of Japanese Application No. 2005-100283, filed on Mar. 31, 2005, the disclosures of which Applications are incorporated by reference herein.

TECHNICAL FIELD

The present invention relates to an indicating instrument to be mounted on a vehicle or the like and, more particularly, to an indicating instrument, not only in which the indicating needle moves to indicate the index formed on the dial, but also in which the indicator performs a digital display of the vehicular information such as the speed of the vehicle or the fuel level.

BACKGROUND ART

In the prior art, as disclosed in Patent Document 1, there is known the indicating instrument, which is provided with a dial around an indicator, an indicating needle extending along the back of the indicator and turning over a display panel. In the indicating instrument disclosed in Patent Document 1, the indicating needle and the indicator are held in a laminate state, in which they overlap in the display direction. This state makes it necessary that a holding member for holding the indicator has to be disposed to retain such a space (or bypass) on the back of the indicator to permits the indicating needle to turn. The indicator is held by the individual holding member having its leg portion extending over a board in the non-turning range of the indicating needle, and the dial is held by the individual holding member. This indicating instrument can provided the vehicular information by summarizing a highly readable analog display using the indicating needle and the dial and a digital display containing much information and capable of performing various indications.

[Patent Document 1] JP-A-2003-254794

DISCLOSURE OF THE INVENTION

Problems that the Invention is to Solve

In the aforementioned indicating instrument, however, the indicator and the dial are held by the individual holding members so that the number of parts of the indicating instrument accordingly increases. Moreover, the indicator and the dial may be less precisely positioned because they are arranged on the board by their individual holding members.

The present invention has been conceived in view of the point thus far described, and has an object to provide an indicating instrument, which is enabled to reduce the number of parts and improve the positioning precision by holding a dial and an indicator by a single member.

Means for Solving the Problem

In order to solve the aforementioned problem, according to the invention, there is provided an indicating instrument, which comprises: an indicator; a dial disposed around said indicator; an indicating needle for moving around said indicator; and a drive source for driving said indicator. Said indicating needle moves over said dial while bypassing at least the back of said indicator, and said indicator and said dial are held by a holding member constituted of a first holding portion for holding said indicator and a second holding portion for holding said dial.

According to the invention, as set forth in claim 2, moreover, said indicating needle turns over the outer edge portion of said dial while bypassing said indicator and said dial.

According to the invention, as set forth in claim 3, moreover, said second holding portion includes lighting portions.

According to the invention, as set forth in claim 4, moreover, said second holding portion includes an edge portion, and beam portions for connecting said edge portion and said first holding portion, and said beam portions are spaced from said dial.

According to the invention, as set forth in claim 5, moreover, said holding member is connected in the non-turning range, in which said indicator does not turn, to at least a case housing said drive source.

ADVANTAGE OF THE INVENTION

According to the invention, it is possible to provide an indicating instrument, which is enabled to reduce the number of parts and to improve the positioning precision by holding a dial and an indicator by a single member.

DESCRIPTION OF REFERENCE NUMERALS AND SIGNS

1 Indicating Instrument
2 Holding Member
3 Indicator
4 Dial
6 Indicating Needle
7 Drive Source
8 Circuit Board
9 Case
27 First Holding Portion
28 Second Holding Portion
34 Edge Portion
35 Beam Portions
39 Lighting Portions
B Bypass
S Light Diffraction Space

BEST MODE FOR CARRYING OUT THE INVENTION

A mode of embodiment of an indicating instrument 1 according to the invention is described in the following with reference to the accompanying drawings.

Figure 1:
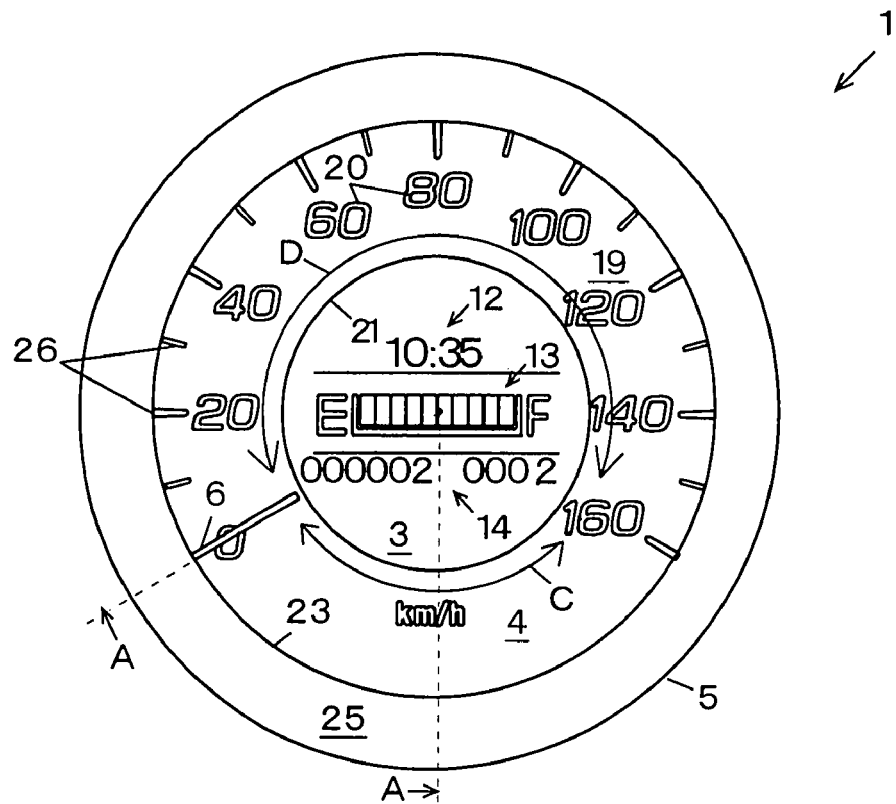
[FIG. 1] A front elevation of an indicating instrument 1 according to a first mode of embodiment.
Figure 2:
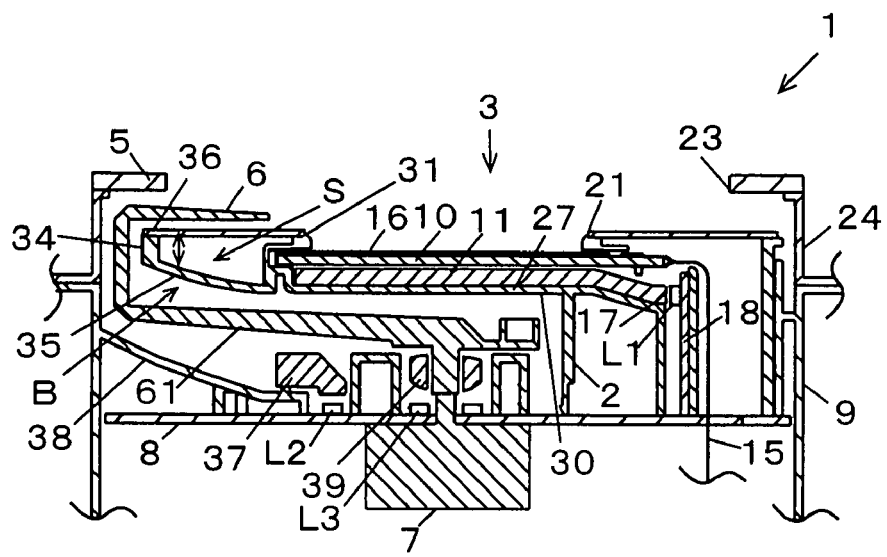
[FIG. 2] section A-A of FIG. 1.
Figure 3:
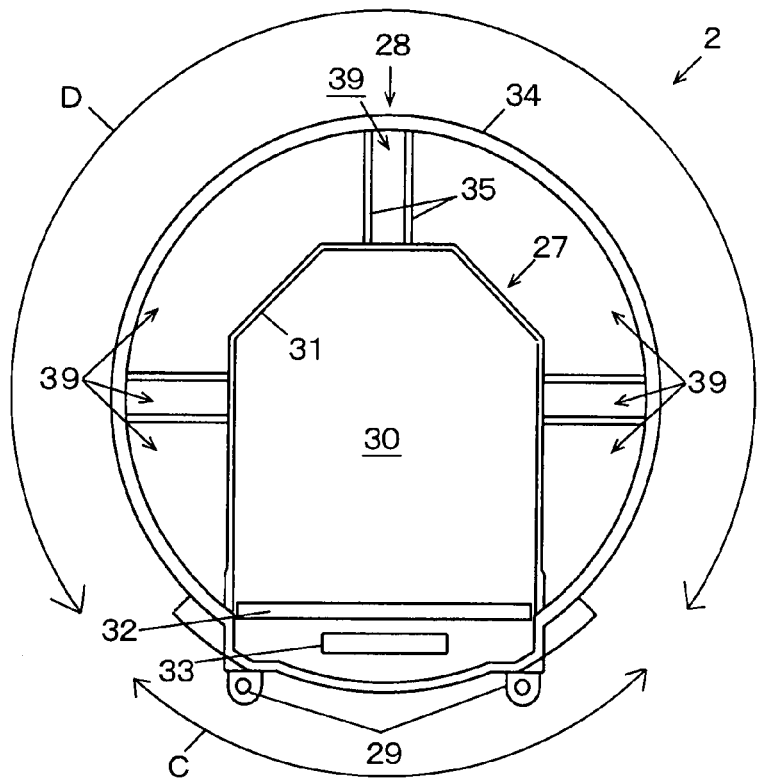
[FIG. 3] A front elevation of a holding member 2 in the same mode of embodiment.

FIG. 1 to FIG. 3 show a first mode of embodiment of the invention. FIG. 1 is a front elevation of the indicating instrument 1; FIG. 2 is a section A-A of FIG. 1; and FIG. 3 is a front elevation of a holding member.

As shown in FIG. 1 and FIG. 2, the indicating instrument 1 according to this mode of embodiment is constituted such that a holding member 2, an indicator 3, a dial 4, a shielding member 5, an indicating needle 6, a drive source 7 for driving the indicating needle 6, and a circuit board 8 are housed in a casing 9. The indicating instrument 1 provides vehicular information by an analog indication of the contrast readings of the indicating needle 6 and the dial 4 and by a digital indication of the indicator 3.

The indicator 3 is composed of a display panel 10, an optical guide 11 and a light source L1, and is arranged at the center of the indicating instrument 1 to indicate a time 12, a fuel level 13, a travel distance 14 and so on. The additional indication information conceivable includes the speed of an engine, the ambient temperature, a warning and so on.

The display panel 10 is prepared by filling a liquid crystal display element such as STN (Super Twisted Nematic) or TN (Twisted Nematic) between two large and small substrates of different sizes made of a glass material, for example. Transparent electrodes are individually formed on the confronting faces of the two substrates. From such a portion of the larger substrate on the display side as to be exposed to the outside, there is extracted a transparent electrode, which is equipped with a terminal portion to be connected with an FPC 15.

The FPC 15 is a connecting member, in which a predetermined circuit wiring (although not shown) is formed of a flexible insulating material such as polyimide thereby to connect the display panel 10 and the circuit board 8 electrically.

The optical guide 11 is a hexagonal flat member made of an acrylic resin along the back of the display panel 10, and guides the light of the light source L1 all over an outgoing face 16 confronting the display panel 10, thereby to illuminate the display panel 10 uniformly. The optical guide 11 is made in parallel with the display panel 10 at its portion confronting the display panel 10, but is sloped down toward the light source at its portion near an incoming face 17 confronting the light source L1 to receive the light.

The light source L1 is an LED of a top view type, and is so mounted in a light source board 18 arranged vertically on the later-detailed circuit board 8 as to confront the incoming face 17 of the optical guide 11.

The dial 4 is equipped with: a background portion 19 prepared by applying, for example, shielding metallic ink to a shielding member made of a synthetic resin or the like; an index portion 20 formed of transparent ink of a white color; and a circle portion 21 facing the indicator 3 at the center.

The index portion 20 is composed of numerals of 0 to 160 indicating the speed of the vehicle, and a scale 26 corresponding to those numerals. The numerals are indexed by 20, and the scale 26 is indexed by 10. The circle portion 21 is cut through the dial 4 to expose the display panel 10. Here, the circle portion 21 may also be formed not by cutting the dial 4 but by facing the display panel 10 in the circular transparent state.

The shielding member 5 is a ring-shaped member having such an aperture portion 23 cut away at the center as to face the dial 4 disposed through a clearance. The shielding member 5 is a member for shielding such a bypass B from the user that the later-described indicating needle 6 may turn on the outer edge of the dial 4.

The shielding member 5 is equipped with a support portion 24, which is connected to fix and support the later-described case 9, so that the shielding member 5 may enclose the dial 4 and may be exposed to the display side through a clearance retained by the support portion 24.

The holding member 2 is a white shielding member made of a synthetic resin or the like for holding the indicator 3 and the dial 4, as shown in FIG. 3. The holding member 2 is composed of a first holding portion 27 for holding the indicator 3, a second holding portion 28 for holding the dial 4, and a connecting portion 29 to be connected and fixed to the case 9, as will be detailed hereinafter.

The first holding portion 27 is equipped with a bottom portion 30, a side portion 31 for enclosing the peripheral edge of the bottom portion 30, an insertion hole 32 of the board 18 for the light source L1, and an insertion hole 33 for the FPC 15. The first holding portion 27 is a cell case for housing and holding the indicator 3. The optical guide 11 is disposed with its back abutting against the bottom portion 30, and the display panel 10 is mounted on the optical guide 11.

The second holding portion 28 is equipped with an edge portion 34, and beam portions 35 for connecting the edge portion 34 and the first holding portion 27. The second holding portion 28 is disposed in a frame shape on the outer circumference of the first holding portion 27 thereby to hold the dial 4 from the back. On the other hand, the holding member 2 forms lighting portions 39 together with the first holding portion 27, the edge portion 34 and the beam portions 35. The lighting portions 39 are light inlets for illuminating the dial 4 from the back.

The edge portion 34 has an arcuate shape and supports the dial 4, an outer edge portion 36 and the circular portion 21 in abutment. The edge portion 34 lies over the first holding portion 27 in the inner edge portion. As a result, the dial 4 is stably disposed on the indicator 3 through the edge portion 34.

The beam portions 35 are reinforcing members, which extend in a manner to draw a radial (as referred to FIG. 3) arch (as referred to FIG. 2) from the first holding portion 27 toward the edge portion 34 supporting the outer edge portion 36 of the dial 4 and which transmits the load applied to the edge portion 34, to the first holding portion 27 to disperse the load thereby to retain the rigidity of the holding member 2. The beam portions 35 are arranged in a pair at each of portions corresponding to 3 o'clock, 9 o'clock and 12 o'clock, as converted into a clock. The beam portions 35 are shielding members formed across a light diffraction space S spaced at a distance of at least about 3 mm from the dial 4. The space S thus formed to eliminate the shadow of the beam portions 35 is enabled to diffract the light emitted from the back to the side of the dial 4 of the beam portions 35 thereby to illuminate the dial 4 as a whole.

Here, the light diffraction space S is arbitrarily set in the distance from the dial 4 in accordance with the arranged position of a light source L2. For example, the distance is shortened, in case the light source L2 for illuminating the dial 4 is arranged just sideway of the beam portions 35, but the distance is elongated, in case the light source L2 is arranged just below the beam portions 35.

The connecting portion 29 is formed with screw holes, through which it is fixed in a non-turning range C of the indicating needle 6 by means of screws. As a result, the holding member 2 need not be connected to the case 9 in the turning range D of the indicating needle 6 so that the bypass B can be retained.

The holding member 2 thus constituted of the single member is enabled to dispense with the dedicated holding member by holding the indicator 3 and the dial 4 thereby to contribute the reduction of the number of parts in the indicating instrument 1. In case the indicator 3 and the dial 4 are held by different parts, moreover, they are indirectly positioned through the individual holding members. This indirect method may complicates the positioning works. In the mode of embodiment, however, the holding member 2 assembles the indicator 3 and the dial 4 at the predetermined position in the holding member 2 so that the indicator 3 and the dial 4 can be positionally adjusted to improve the positioning precision. Moreover, the holding member 2 is so constituted as is connected and held to the case 9 only in the later-specified non-turning range C, so that it can retain the bypass B of the indicating needle 6.

The indicating needle 6 is made of an optically transparent material, and is equipped with a leg portion 61, which is mounted on a drive shaft extending from the center of the drive source 7 mounted on the back of the indicator 3, so that it is turned as the drive shaft rotates. The indicating needle 6 has the turning range D within a range of 240 degrees from 0 to 180 of the index portion 20, and the non-turning range C within the remaining range of about 120 degrees, in which the index portion 20 is not formed. The turning range D is provided with the bypass B, which is the space for the indicating needle 6 (and the leg portion 61) to turn over the outer circumference and the back of the dial 4.

The leg portion 61 is disposed at the leading end of the drive shaft, and extends along the backs of the indicator 3 and the dial 4 toward the outer edge portion 36 of the dial 4. The leg portion 61 is bent, when it reaches the outer circumference of the dial 4, by 90 degrees in the thrust direction with respect to the turning direction so that its leading end is protruded through the bypass B to the side of the dial 4. The indicating needle 6 is disposed at that leading end along the surface of the dial 4. The indicating needle 6 is equipped on its back with a red reflecting layer (although not shown). Around the portion, through which the drive shaft extends, of the circuit board 8, the indicating needle 6 is further equipped with a light source L3 of red color, so that it receives the red light from the light source L3 thereby to illuminate in the red color.

The drive source 7 is made of a stepping motor, a cross coil or the like, and is disposed on the back of the later-detailed circuit board 8. The drive source 7 has the drive shaft extending from the drive source 7 through the circuit board 8 toward the dial 4, and fixes the leg portion 61 at its leading end.

The indicating needle 6 thus constituted is enabled to perform the bypass movement by the holding member 2 for holding the dial 4 and the indicator 3.

The circuit board 8 is a hard board made of an glass-epoxy resin or the like, and is mounted on its back with the drive source 7 and on its front with the light sources L2 and L3 made of LEDs. The light source L2 uses an optical guide 37 and a reflecting plate 38 disposed in the later-specified case 9, to illuminate the index portion 20 of the dial 4 with the light which passes through the lighting portions 39 of the light inlets formed in the second holding portion 28 by the edge portion 34 and the beam portions 35. The light source L3 illuminates the indicating needle 6 through the optical guide 39.

The case 9 is made of a synthetic resin, and covers the back side of the circuit board 8 thereby to house the major components of the indicating instrument 1, such as the indicator 3, the dial 4, the holding member 2, the indicating needle 6, the drive source 7, the circuit board 8 and so on. The case 9 is fixed at the connecting portion 29 of the holding member 2 in the non-turning range C of the indicating needle 6, and holds the holding member 2.

The indicating instrument 1 of the mode of embodiment thus constituted is enabled to reduce the number of parts and to improve the positioning precision by holding the indicator and the dial 4 with the common holding member 2.

Thus, the indicating instrument 1 of the invention is enabled to reduce the number of parts and to improve the positioning precision by the holding member 2 for holding both the indicator 3 and the dial 4.

Moreover, the invention is effectively used in the indicating instrument 1, in which the indicating needle 6 indicates across the indicator 3 and the dial 4.

Moreover, the invention is enabled to illuminate the dial 4 by taking the light from the lighting portions, which are formed by the first holding portion 27, the beam portions 35 and the edge portion 34.

According to the invention, moreover, the beam portions 35 are spaced from the dial 4 through the space S so that the light can be diffracted to prevent the beam portions 35 from being projected on the back of the dial 4, thereby to illuminate the dial 4 uniformly.

According to the invention, moreover, the holding member 2 is connected in the non-turning range C to the case 9, so that the indicating needle 6 can retain its turning range D wide and can be turned across the indicator 3 and the dial 4 from the outer edge portion 36 of the dial 4.

Figure 4:
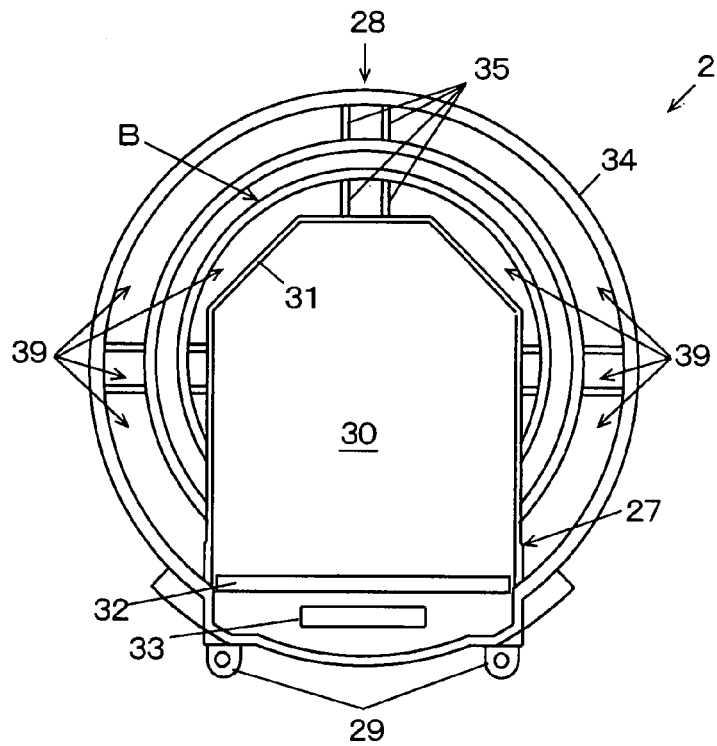
[FIG. 4] A front elevation of a holding member 2 according to a second same mode of embodiment.

Here in this mode of embodiment, the indicating needle 6 extends along the indicator 3 and the dial 4, and turns for indications across the outer edge portion 36 of the dial 4. In the invention, however, it is sufficient that the indicating needle 6 bypasses at least the indicator 3, and the shape of the holding member 2 is accordingly set arbitrary. In case the indicating needle 6 bypasses the indicator 3 and turns around the indicator 3 for the indications, for example, the dial 4 is opened to form the bypass B for the turning indications. In a second mode of embodiment, the holding member 2 may be set with the bypass B to correspond to that opening, as shown in FIG. 4. In this modification, the holding member 2 can be connected to the case 9 not only in the non-turning range C but also in the turning range D.

In this mode of embodiment, moreover, the indicator 3 uses the liquid crystal element but may also use an electroluminescence element or a fluorescent display tube.

In this mode of embodiment, moreover, the shapes of the indicator 3, the optical guide 11 and the first holding portion 27 are generally hexagonal, as viewed from the front, but may also be arbitrary.

Moreover, the second holding portion 28 may have an arbitrary shape, and the arrangement positions and the number of the beam portions 35 are likewise set arbitrary.

INDUSTRIAL APPLICABILITY

The invention relates to an indicating instrument to be mounted on the vehicle or the like and, more particularly, to an indicating instrument, not only in which the indicating needle moves to indicate the index formed on the dial, but also in which the indicator performs a digital display of the vehicular information such as the speed of the vehicle or the fuel level.

Designation of Document

The invention claimed is:
1. An indicating instrument comprising:
an indicator;
a dial disposed around said indicator; an indicating needle for moving around said indicator; and
a drive source for driving said indicating needle, characterized in that said indicating needle moves over said dial while passing behind at least the back of said indicator, and in that said indicator and said dial are held by a holding member constituted of a first holding portion for holding said indicator and a second holding portion for holding said dial, wherein, said indicating needle turns over an outer edge portion of said dial while bypassing said indicator and said dial, and wherein said indicator and said dial form a unitary structure.

2. An indicating instrument as set forth in claim 1, characterized in that said second holding portion includes lighting portions.

3. An indicating instrument as set forth in claim 1, characterized in that said second holding portion includes an edge portion, and beam portions for connecting said edge portion and said first holding portion, and in that said beam portions are spaced from said dial.

4. An indicating instrument as set forth in claim 1, characterized in that said holding member is connected in a non-turning range, in which said indicating needle does not turn, to at least a case housing said drive source.

* * * * *